US012228272B2

(12) United States Patent
Tang et al.

(10) Patent No.: US 12,228,272 B2
(45) Date of Patent: Feb. 18, 2025

(54) LAMP UNIT, LAMP SYSTEM AND METHOD FOR MOUNTING LAMP SYSTEM

(71) Applicant: SAVANT TECHNOLOGIES LLC, East Cleveland, OH (US)

(72) Inventors: Fangru Tang, Shanghai (CN); Aijun Wang, Shanghai (CN); Zhiyong Wang, Shanghai (CN); Liang Shan, Beijing (CN); Dong Xing, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 18/240,602

(22) Filed: Aug. 31, 2023

(65) Prior Publication Data

US 2024/0068651 A1 Feb. 29, 2024

(30) Foreign Application Priority Data

Aug. 31, 2022 (CN) ......................... 202211064551.5

(51) Int. Cl.
*F21V 23/06* (2006.01)
*F21S 2/00* (2016.01)

(52) U.S. Cl.
CPC .............. *F21V 23/06* (2013.01); *F21S 2/005* (2013.01)

(58) Field of Classification Search
CPC ................................ F21V 23/06; F21S 2/005
See application file for complete search history.

(56) References Cited

U.S. PATENT DOCUMENTS

2021/0095839 A1* 4/2021 Rodinger ............ F21V 19/0055

FOREIGN PATENT DOCUMENTS

| | | | |
|---|---|---|---|
| AU | 2017254789 | A1 | 12/2018 |
| CN | 205118934 | U | 3/2016 |
| CN | 210831566 | U | 6/2020 |
| WO | 2017181291 | A1 | 12/2018 |

* cited by examiner

*Primary Examiner* — Mary Ellen Bowman

(57) ABSTRACT

The present disclosure relates to lamp unit, lamp system and method for mounting the lamp system. The lamp unit includes: a lamp panel having a cavity formed by a light-emitting surface and a back surface, is provided with light-emitting elements and a plurality of electrical contact points that are electrically connected to the light-emitting elements, and a plurality of openings to expose the electrical contact points; and a mounting unit configured to be detachably mounted on a back surface center portion of the back surface and used for mounting the lamp unit on a predetermined position, and the mounting unit is provided with a plurality of connection positions for forming an electrical connection with another lamp unit. By means of the above manner, the operation of mounting a connector on the lamp unit is easier.

22 Claims, 12 Drawing Sheets

LAMP UNIT, LAMP SYSTEM AND METHOD FOR MOUNTING LAMP SYSTEM

CROSS-REFERENCE TO RELATED APPLICATIONS

This application claims the benefit of Chinese Patent Application Serial Number 202211064551.5, filed Aug. 31, 2022, which is incorporated herein by reference.

FIELD OF TECHNOLOGY

The present disclosure relates to the field of lamps. In particular, the present disclosure relates to a lamp unit, a lamp system and a method for mounting the lamp system.

BACKGROUND

LED panel lamps may be spliced and combined to form specific light-emitting patterns and light-emitting effects. In the prior art, a plurality of LED panel lamps are electrically connected by flat cables, so as to be spliced and combined.

When the LED panel lamps are spliced and combined, before a mounting plate is snapped with a lamp panel backseat, one end of a flat cable is inserted into one open slot of the lamp panel backseat of one LED panel lamp, so as to be electrically connected to a contactor in the open slot, and a bonding pad on the other end of the flat cable is inserted into one open slot of the lamp panel backseat of another LED panel lamp, so as to be electrically connected to the contactor in the open slot. In this way, a plurality of LED panel lamps can be electrically connected together by the flat cables to form specific light-emitting patterns and light-emitting effects. In order to ensure that each LED panel lamp is thin enough, the height of the open slot from the back surface of the LED panel lamp is usually relatively low, therefore when an operator inserts the bonding pad of the flat cable into the open slot, the operating space is relatively small, which is inconvenient for the operator to operate.

In view of this, it is desirable to provide a lamp unit, a mounting device, a lamp system and a mounting method thereof, so as to solve the above-mentioned technical problems.

SUMMARY

The purpose of the present disclosure is to provide a lamp unit, a lamp system and a mounting method thereof. By means of detachably mounting connectors on mounting units, disposing electrical contact points on lamp units, and electrically connecting contactors of the connectors to the electrical contact points on the lamp units by means of the mounting units, the lamp units are spliced and combined. In this way, it is easier to mount the connectors on the lamp units, and meanwhile the manufacturing cost is reduced.

According to an embodiment of the present disclosure, a lamp unit is provided, including: a lamp panel having a light-emitting surface and a back surface opposite to the light-emitting surface, wherein a cavity formed by the light-emitting surface and the back surface is provided with light-emitting elements and a plurality of electrical contact points that are electrically connected to the light-emitting elements, and a plurality of openings are formed in the back surface at positions corresponding to each of the electrical contact points, so as to expose the electrical contact points; and a mounting unit configured to be detachably mounted on a back surface center portion of the back surface and used for mounting the lamp unit on a predetermined position, wherein the mounting unit is provided with a plurality of connection positions corresponding to the openings in the back surface center portion, and the connection positions are used for forming an electrical connection with another lamp unit.

By means of disposing the connection positions on the mounting unit, a user can have a greater operating space to connect the connector to the mounting unit, such that the operation of mounting the connector on the lamp unit is easier.

In the lamp unit according to the embodiment of the present disclosure, the back surface center portion is disposed at the center of the back surface, and a plurality of openings for exposing the electrical contact points are formed in a top surface of the back surface center portion at positions corresponding to each of the electrical contact points.

By means of the above manner, a specific manner of disposing a plurality of openings is provided.

In the lamp unit according to the embodiment of the present disclosure, the mounting unit is detachably mounted on the back surface center portion in a snapping manner.

By means of snapping, the mounting unit can be easily mounted on or removed from the lamp panel.

In the lamp unit according to the embodiment of the present disclosure, the shape of the top surface of the back surface center portion corresponds to that of the mounting unit, and the plurality of openings for exposing the plurality of electrical contact points on the top surface are formed at uniform intervals along the edge of the top surface.

Since the shape of the top surface of the back surface center portion corresponds to that of the mounting unit, it is conducive to provide a mounting guidance for the user, such that the mounting unit can be mounted on the lamp panel more easily.

In the lamp unit according to the embodiment of the present disclosure, the shape of the top surface of the back surface center portion and the shape of the mounting unit correspond to that of the lamp panel.

By means of the above manner, the mounting unit can be mounted on the lamp panel more easily, the lamp units can be spliced and combined more easily, and the appearance of the lamp units is beautiful.

In the lamp unit according to the embodiment of the present disclosure, the back surface center portion protrudes from the center of the back surface in a direction opposite to the light-emitting surface.

By means of the above manner, a specific structure of the back surface center portion is provided, and a circuit of the lamp panel can be accommodated in this structure, such that the thickness of the lamp panel around the structure is reduced, thereby realizing an overall decrease in the thickness of the lamp panel, and improving the beautiful appearance and the light-emitting efficiency.

In the lamp unit according to the embodiment of the present disclosure, the mounting unit includes: a base plate; and a side plate, wherein the side plate extends on the edge of the base plate in a direction perpendicular to the base plate, and a plurality of connection positions are disposed on the side plate.

By means of the above manner, a specific form of the mounting unit is provided.

In the lamp unit according to the embodiment of the present disclosure, each connection position is provided with a contactor fixing member.

By means of disposing the contactor fixing member, the contactors located at both ends of the connector can be firmly fixed on the connection positions of the mounting unit.

In the lamp unit according to the embodiment of the present disclosure, the center of the base plate is provided with a mounting hole for fixing the mounting unit to a predetermined position.

By means of providing the mounting hole, when the lamp panel mounted on the mounting unit is relatively heavy, the lamp panel can be fixed at a predetermined position by mounting, for example, a traceless nail in the mounting hole, so as to prevent the mounting unit from falling off from the predetermined position.

According to another embodiment of the present disclosure, a lamp system is provided, including: a plurality of lamp units, and each lamp unit including: a lamp panel having a light-emitting surface and a back surface opposite to the light-emitting surface, wherein a cavity formed by the light-emitting surface and the back surface is provided with light-emitting elements and a plurality of electrical contact points that are electrically connected to the light-emitting elements, a back surface center portion is disposed at the center of the back surface, and a plurality of openings for exposing the electrical contact points are formed in a top surface of the back surface center portion at positions corresponding to each of the electrical contact points; and a mounting unit configured to be detachably mounted on the back surface center portion and used for mounting each lamp unit on a predetermined position, wherein the mounting unit is provided with a plurality of connection positions corresponding to the openings in the back surface center portion, and the connection positions are used for forming an electrical connection with another lamp unit; and at least one connector having a first end and a second end, and both the first end and the second end are provided with contactors, wherein the contactor on the first end of each connector is accommodated in one connection position of one mounting unit, and is electrically connected to the electrical contact point in the opening which corresponds to the one connection position of the one mounting unit, and the contactor on the second end of each connector is accommodated in another connection position of another mounting unit, and is electrically connected to the electrical contact point in the opening which corresponds to the other connection position of the other mounting unit, so as to electrically connect the plurality of lamp units.

In the lamp system according to the other embodiment of the present disclosure, by means of disposing the connection positions on the mounting unit, the user can have a greater operating space to connect the connector to the mounting unit, and then mount the mounting unit on the lamp panel, such that the operation of mounting the connector on the lamp unit is easier. In addition, by means of disposing the contactors, for example, in the form of spring metals, on the connector, disposing the electrical contact points, for example, in the form of boding pads, on the lamp units, and respectively connecting the contactors on the both ends of the connector to the electrical contact points of the adjacent lamp units via the mounting unit, the lamp units are spliced and combined. In this way, the waste of the higher-cost contactors is avoided, and the manufacturing cost of the lamp units is reduced.

In the lamp system according to the other embodiment of the present disclosure, the shape of the top surface of the back surface center portion corresponds to that of the mounting unit, and the plurality of openings for exposing the plurality of electrical contact points on the top surface are formed at uniform intervals along the edge of the top surface.

Since the shape of the top surface of the back surface center portion corresponds to that of the mounting unit, the mounting unit can be mounted on the lamp panel more easily.

In the lamp system according to the other embodiment of the present disclosure, the mounting unit is provided with a base plate having a shape corresponding to that of the top surface, and a side plate extending on the edge of the base plate toward the top surface in a direction perpendicular to the base plate, wherein the mounting unit is provided, at least on the side plate, with a plurality of connection positions which correspond to the plurality of electrical contact points of the connected lamp unit, respectively.

By means of the above manner, a specific form of the mounting unit is provided.

In the lamp system according to the other embodiment of the present disclosure, the shape of the top surface of the back surface center portion and the shape of the mounting unit correspond to that of the lamp panel.

By means of the above manner, the mounting unit can be mounted on the lamp panel more easily, and the lamp units can be spliced and combined more easily.

In the lamp system according to the other embodiment of the present disclosure, each connection position is provided with a contactor fixing member for fixing the contactor that is accommodated in the connection position, the contactor on the first end of the connector is fixed by the contactor fixing member at one connection position of one mounting unit, and the contactor on the second end of the connector is fixed by the contactor fixing member at the other connection position.

By means of disposing the contactor fixing member, the contactor at the corresponding connection position can be fixed on the corresponding mounting unit.

In the lamp system according to the other embodiment of the present disclosure, the back surface center portion protrudes from the center of the back surface in a direction opposite to the light-emitting surface, and the connection position is a plug-in stuck slot, wherein the contactor may be inserted into the connection position to be fixed by the contactor fixing member.

The connection position in the form of the plug-in stuck slot can allow the user to insert a contactor of the connector into the stuck slot at first while mounting the lamp system, and then mount the mounting unit, into which the contactor has been inserted, on the lamp panel. Compared with the manner of disposing the connection position in the form of the plug-in stuck slot on the lamp panel, the user can have a greater operating space to connect the connector to the mounting unit, such that the operation of mounting the connector on the lamp unit is easier.

In the lamp system according to the other embodiment of the present disclosure, the connection position extends from the edge of the base plate in the side plate along the peripheral direction of the base plate and the extension direction of the side plate, and the portion of the connection position on the side plate is provided with a first wall portion and a second wall portion, which are opposite to each other in the peripheral direction of the base plate, the contactor fixing member includes a first fixing member and a second fixing member, the first fixing member extends from the first wall portion perpendicular to the side plate toward the center direction of the base plate, the second fixing member extends from the second wall portion perpendicular to the side plate toward the center direction of the base plate, the first fixing member is provided with a first protrusion on the end portion away from the first wall portion, the second fixing member is provided with a second protrusion on the end portion away from the second wall portion, the first protrusion and the second protrusion protrude opposite to each other toward the space between the first fixing member and the second fixing member, the both sides of the contactor are provided with recesses, and when the contactor is accommodated in the connection position, the first protrusion and the second protrusion are respectively located in the recesses that are provided on the both sides of the contactor.

By means of the above manner, a specific disposition form of the plug-in stuck slot is provided, such that the connector can be better fixed.

In the lamp system according to the other embodiment of the present disclosure, the connection position is a press-type stuck slot, wherein the contactor may be pressed to the connection position, so as to be fixed by the contactor fixing member.

The connection position in the form of the press-type stuck slot can allow the mounting unit to be mounted on the lamp panel when the lamp system leave the factory, and when in use, the user can realize the spicing and combination of the lamp units just by directly pressing the contactor of the connector into the stuck slot, such that the lamp system is mounted more easily and conveniently.

In the lamp system according to the other embodiment of the present disclosure, the connection position includes a first portion and a second portion, the first portion extends from the edge of the base plate in the side plate along the peripheral direction of the base plate and the extension direction of the side plate, the portion of the first portion on the side plate is provided with a first wall portion and a second wall portion, which are opposite to each other in the peripheral direction of the base plate, the second portion extends from the first wall portion and the second wall portion perpendicular to the side plate toward the center direction of the base plate, the first portion and the second portion are penetrated through to form the connection position, the second portion includes a first side corresponding to the first wall portion and a second side corresponding to the second wall portion, the contactor fixing member includes a first protrusion protruding from the base plate on the first side and a second protrusion protruding from the base plate on the second side, the first protrusion and the second protrusion protrude opposite to each other from the base plate toward the space between the first side and the second side, the both sides of the contactor are provided with recesses, and when the contactor is accommodated in the connection position, the first protrusion and the second protrusion are respectively located in the recesses that are provided on the both sides of the contactor.

By means of the above manner, a specific disposition form of the press-type stuck slot is provided, such that the connector can be better fixed.

In the lamp system according to the other embodiment of the present disclosure, the contactor is provided with a spring metal, and when the mounting unit is mounted on the back surface center portion, the spring metal forms, by means of the opening, an electrical connection with the electrical contact point in the opening.

By means of disposing a single spring metal on the connector as the contactor, the electrical contact point in the opening can be in the form of a gold finger, and the spring metal is more expensive than the gold finger in general. Compared with the manner of disposing a plurality of spring metals on the back surface of the lamp panel, the number of actually used spring metals is reduced, and the connector can be used as needed, thereby avoiding the waste of the higher-cost spring metals resulting from the disposition of the spring metals on the back surface of the lamp panel, and reducing the manufacturing cost.

In the lamp system according to the other embodiment of the present disclosure, the contactors on the first end and the second end of the connector are connected by a flexible conductor.

By means of the above manner, a specific disposition form of the connector is provided. When two lamps are connected, the flexible conductor enables the user not only to realize seamless splicing of the lamp panels, but also to space the lamp panels for a certain distance as required, therefore a space is provided for personalized design.

In the lamp system according to the other embodiment of the present disclosure, the first end and the second end of the connector are respectively provided with grabbing portions, and the surfaces of the grabbing portions are provided with anti-skid patterns.

By means of disposing the anti-skid patterns on the surfaces of the grabbing portions, it is easier to mount the connector on the mounting unit.

According to yet another embodiment of the present disclosure, a method for mounting the lamp system is provided, including: step 1, correspondingly mounting the mounting unit on the back surface center portion of the lamp panel, so as to obtain a predetermined assembly of the mounting unit and the lamp panel, such that the connection positions on the mounting unit are in one-to-one correspondence with the openings of the back surface center portion and the electrical contact points in the openings; step 2, connecting the contactor on one end of one connector to one connection position of the mounting unit in one predetermined assembly, such that the contactor on one end of the one connector is electrically connected to the electrical contact point in the opening of the back surface center portion, which corresponds to the one connection position; step 3, mounting the one predetermined assembly on a predetermined position by means of the mounting unit in the one predetermined assembly; step 4, connecting the contactor on the other end of the one connector to one connection position of the mounting unit in another predetermined assembly, such that the contactor on the other end of the one connector is electrically connected to the electrical contact point in the opening of the back surface center portion, which corresponds to the one connection position of the mounting unit in the other predetermined assembly, wherein the lamp system includes a power line, the contactor on one end of the power line is connected to one connection portion of the mounting unit in the first predetermined assembly during the mounting process of the lamp system, so as to supply power to the lamp system.

By means of the above manner, all mounting units can be mounted on the lamp panel before the lamp units leave the factory. During the mounting process, the user can splice and combine the lamp units just by mounting the connectors on the mounting units, such that the user can easily splice and combine the lamp units, thereby improving the installation/assembly efficiency.

BRIEF DESCRIPTION OF THE DRAWINGS

The drawings described herein are used for providing a further understanding of the present disclosure and constitute a part of the present disclosure. Exemplary embodiments of the present disclosure and descriptions thereof are used for explaining the present disclosure, but do not constitute improper limitations of the present disclosure. In the drawings.

DETAILED DESCRIPTION

In order that those skilled in the art may better understand the solutions of the present disclosure, a clear and complete description of technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those of ordinary skill in the art based on the embodiments in the present disclosure without any creative effort, fall into the protection scope of the present disclosure.

Figure 1:
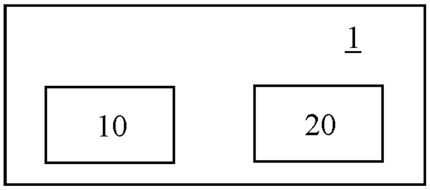
FIG. 1 shows a block diagram of a lamp unit according to an embodiment of the present disclosure.
Figure 2:
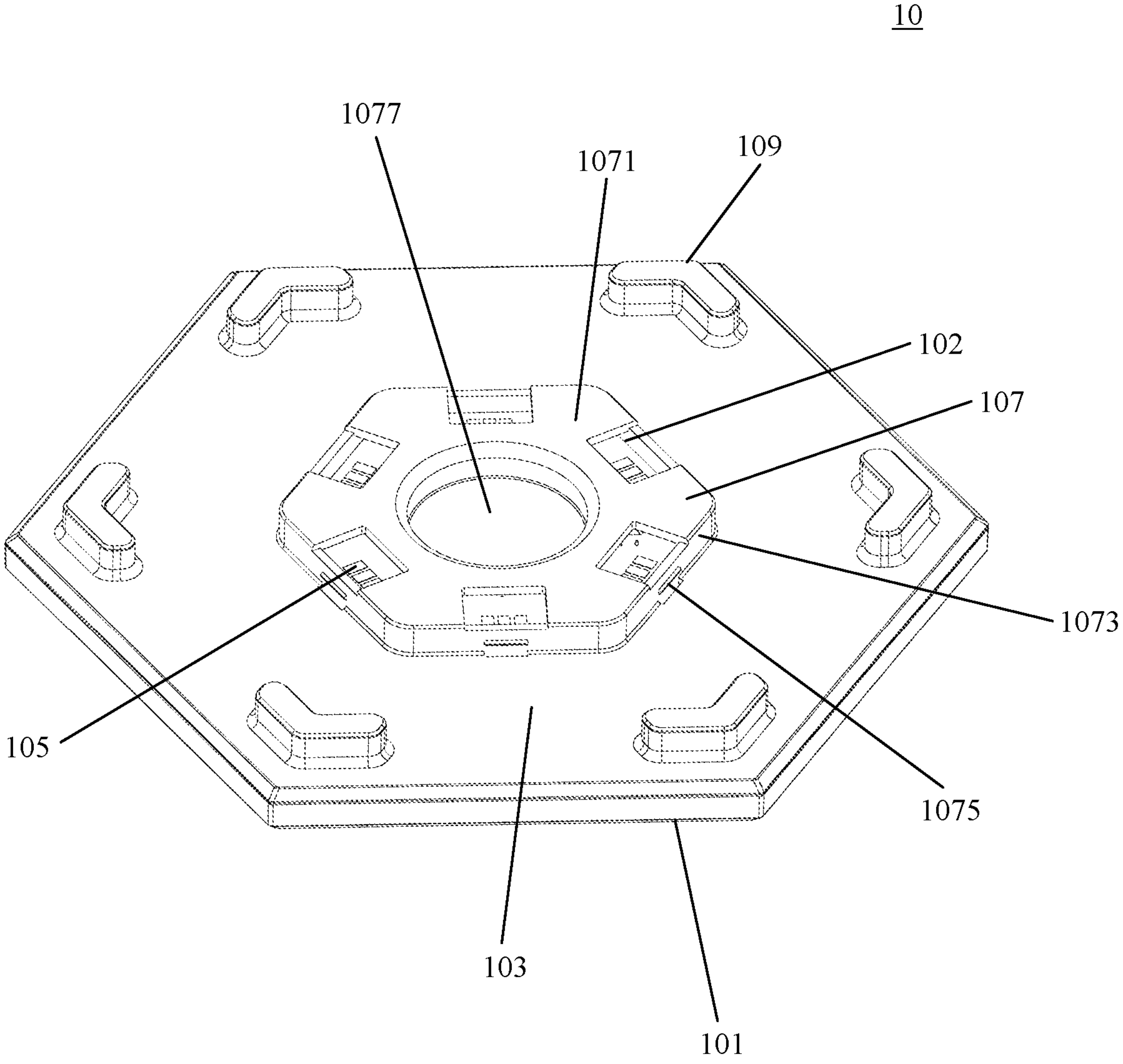
FIG. 2 shows a specific structural diagram of a lamp panel of the lamp unit according to the embodiment of the present disclosure.
Figure 3:
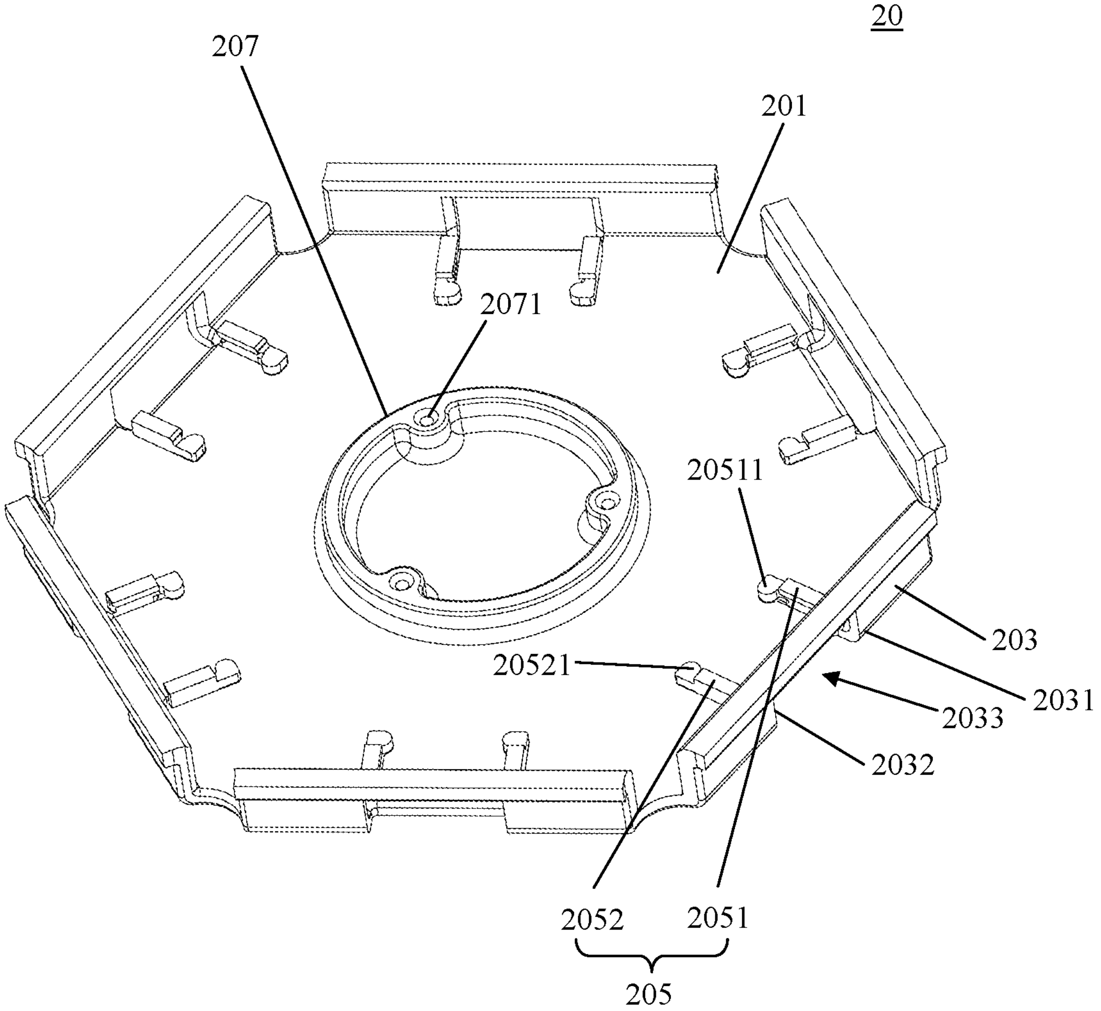
FIG. 3 shows a specific structural diagram of a mounting unit of the lamp unit according to the embodiment of the present disclosure.

According to an embodiment of the present disclosure, a lamp unit is provided. FIG. 1 shows a block diagram of the lamp unit according to the embodiment of the present disclosure, and a lamp panel and a mounting unit in the lamp unit are shown in a separate manner for clarity. FIG. 2 shows a specific structural diagram of the lamp panel of the lamp unit according to the embodiment of the present disclosure, and FIG. 3 shows a specific structural diagram of the mounting unit of the lamp unit according to the embodiment of the present disclosure. The lamp unit according to the embodiment of the present disclosure will be described below in combination with FIG. 1 to FIG. 3.

The lamp unit 1 may include a lamp panel 10 and a mounting unit 20, and the lamp unit is mounted at a predetermined position by means of the mounting unit 20.

Specifically, as shown in FIG. 2, the lamp panel 10 has a light-emitting surface 101 and a back surface 103 opposite to the light-emitting surface 101. A cavity formed by the light-emitting surface 101 and the back surface 103 is provided with light-emitting elements and a plurality of electrical contact points 105 that are electrically connected to the light-emitting elements, and the light from the light-emitting elements is emitted from the light-emitting surface 101 to the outside of the lamp panel 10. Six electrical contact points 105 are shown in FIG. 2, each electrical contact corresponds to one side edge of the lamp panel, but the present disclosure is not limited thereto, and more or less electrical contact points may be designed as required. The electrical contact points may be a gold finger or a spring metal, and the electrical contact points in the present embodiment are preferably gold fingers with a lower cost.

A back surface center portion 107 is disposed at the center of the back surface 103 of the lamp panel 10, a plurality of openings 102 for exposing the electrical contact points 105 are formed in a top surface 1071 of the back surface center portion 107 at positions corresponding to each of the electrical contact points 105, and a connection portion 1075 is disposed on a side surface 1073 of the back surface center portion 107.

Specifically, the back surface center portion 107 protrudes from the center of the back surface 103 in a direction opposite to the light-emitting surface 101, that is, in FIG. 2, the back surface center portion 107 protrudes upward from the center of the back surface 103 of the lamp panel 10. The back surface center portion 107 has a top surface 1071 in a direction away from the back surface 103, and a side surface 1073 that extends from the center of the back surface 103 in the direction away from the back surface 103 and connects the back surface 103 with the top surface 1071. However, the present disclosure is not limited thereto, for example, the top surface 1071 of the back surface center portion 107 may also be flush with the back surface 103 of the lamp panel 10 or lower than the back surface 103 of the lamp panel 10, and a neck for clamping the mounting unit therein is formed between the back surface center portion 107 and the lamp panel 10.

FIG. 2 shows six openings 102 for exposing the six electrical contact points 105 respectively, but the present disclosure is not limited thereto, and more or less openings may be formed according to the number of electrical contact points.

The connection portion 1075 is disposed on the side surface 1073 at a position corresponding to each electrical contact point 105. Six connection portions 1075 are shown in FIG. 2, but the present disclosure is not limited thereto, and more or less connection portions may be designed as required.

The connection portion 1075 may include a protrusion that protrudes outward from the side surface 1073 of the back surface center portion 107 and/or a recess that recesses into the back surface center portion 107 from the sides 1073 of the back surface center portion 107. In FIG. 2, the case where all the six connection portions 1075 are protrusions is shown, but the present disclosure is not limited thereto, a part of the six connection portions 1075 may be protrusions, and the remaining connection portions 1075 may be recesses, or, the six connection portions 1075 may all be recesses.

The shape of the lamp panel 10 may correspond to that of the top surface 1071 of the back surface center portion 107, so as to provide a mounting guidance for mounting the mounting unit on the lamp panel, that is, it is easy to perform mounting after aligning the connection positions on the mounting unit with the corresponding openings of the back surface center portion, thereby improving the mounting efficiency. For example, in FIG. 2, the shape of the lamp panel 10 and the shape of the top surface 1071 of the back surface center portion 107 are both hexagons, and corresponding sides of the two hexagons are parallel to each other. However, the present disclosure is not limited thereto, and the shape of the lamp panel 10 and the shape of the top surface 1071 may be polygonal shapes such as triangles, quadrilaterals and pentagons. In addition, the shape of the lamp panel 10 and the shape of the top surface 1071 do not necessarily correspond to each other, for example, the shape of the lamp panel 10 may be a hexagon, but the shape of the top surface 1071 may be a circle, a triangle, a quadrilateral, or the like.

The plurality of openings 102 on the top surface 1071 for exposing the plurality of electrical contact points 105 may be formed at uniform intervals along the periphery of the top surface 1071. As shown in FIG. 2, one electrical contact point 105 is disposed on the periphery of the top surface 1071, that is, on a middle position of each side of the hexagon, and the 6 openings are correspondingly formed in each side of the hexagon, so as to expose the corresponding electrical contact points 105.

The center of the back surface center portion 107 may include a circular open pore 1077 that recesses from the top portion 1071 of the back surface center portion 107 to the back surface 103 of the lamp panel 10, and the plurality of openings 102 are formed around the open pore 1077. As shown in FIG. 2, the circular open pore 1077 is formed in the center of the back surface center portion 107, and the six openings are evenly formed in the middle position of each side of the hexagon around the open pore 1077.

Optionally, the lamp unit 1 according to the embodiment of the present disclosure may further include a plurality of locating pads 109, these locating pads 109 are disposed at uniform intervals along the periphery of the back surface of the lamp panel 10 of the lamp unit 1, such that the lamp unit 1 may be fixed at a predetermined position more stably. In FIG. 2, six locating pads 109 are shown, and the six locating pads 109 are respectively located at six corners of the hexagonal lamp panel 10.

The mounting unit 20 is detachably mounted (e.g., in a snapping manner) on the back surface center portion 107 of the back surface 103 of the lamp panel 10, and is used for mounting the lamp unit 1 on the predetermined position. The mounting unit is used for forming an electrical connection between one lamp unit and another lamp unit.

Specifically, as shown in FIG. 3, the mounting unit 20 may include a base plate 201 and a side plate 203.

The side plate 203 extends on the periphery of the base plate 201 in a direction perpendicular to the base plate 201, a plurality of connection positions 2033 for accommodating the contactors are disposed on the side plate 203, and the plurality of connection positions 2033 correspond to the plurality of openings 102 in the back surface center portion 107. The contactor may be a component for forming an electrical connection with the electrical contact point 105 of the lamp unit 1, as an example. For example, the contactor may be a spring metal. By means of disposing the contactor, for example, a spring metal, on the connector, and disposing the electrical contact point, for example, a bonding pad, on the lamp unit, the waste of the higher-cost contactor is avoided, and the manufacturing cost of the lamp unit is reduced. In FIG. 3, six connection positions 2033 are shown, but the present disclosure is not limited thereto, and more or less connection positions 2033 may be designed as required.

A connection portion for mounting the mounting unit 20 on the lamp unit 1 is disposed at a position corresponding to each connecting position 2033 on one side of the side plate 203 facing the center direction of the base plate 201. In FIG. 3, the six connection positions 2033 are used as six connection portions. However, the present disclosure is not limited thereto, the connection portion may include a protrusion that protrudes toward the center direction of the base plate 201 from the side of the side plate 203 facing the center direction of the base plate 201 and/or a recess that recesses inward the side plate 203 from the side of the side plate 203 facing the center direction of the base plate 201.

Each connection position 2033 is provided with a contactor fixing member 205 for fixing the contactor that is accommodated in the connection position 2033.

FIG. 3 shows a case where the connection position 2033 is a plug-in stuck slot, which is especially suitable for the design in which the back surface center portion protrudes from the back surface of the lamp panel. As shown in FIG. 3, the connection positions 2033 are only disposed on the side plate 203 of the mounting unit 20. For each connection position 2033, it extends from the edge of the base plate 201 in the side plate 203 along the peripheral direction of the base plate 201 and the extension direction of the side plate 23. It should be noted here that, the "peripheral direction of the base plate" refers to a direction surrounding the periphery of the base plate, and the direction changes with the change in the peripheral shape of the base plate. In FIG. 3, the extension direction of the side plate 203 is an upward direction, and the connection position 2033 penetrates through the side plate 203 in a direction perpendicular to the extension direction of the side plate 203.

The portion of the connection position 2033 on the side plate 203 is provided with a first wall portion 2031 and a second portion 2032, which are opposite to each other in the peripheral direction of the base plate 201. The contactor fixing member 205 includes a first fixing member 2051 and a second fixing member 2052, the first fixing member 2051 extends from the first wall portion 2031 perpendicular to the side plate 203 toward the center direction of the base plate 201, the second fixing member 2052 extends from the second wall portion 2032 perpendicular to the side plate 203 toward the center direction of the base plate 201, and the first fixing member 2051 and the second fixing member 2052 are both fixed on the base plate 201.

The first fixing member 2051 is provided with a first protrusion 20511 on the end portion away from the first wall portion 2031, the second fixing member 2052 is provided with a second protrusion 20521 on the end portion away from the second wall portion 2032, and the first protrusion 20511 and the second protrusion 20521 protrude opposite to each other toward the space between the first fixing member 2051 and the second fixing member 2052.

The shape of the base plate 201 may correspond to that of the top surface 1071 of the back surface center portion of the lamp unit 1, so as to facilitate the mounting guidance, such that the mounting unit is mounted on the lamp panel more easily. As shown in FIG. 3, the shape of the base plate 201 may be a hexagon, and the six connection positions 2033 are correspondingly disposed at the middle position of each side of the hexagon. However, the shape of the base plate 201 is not limited thereto, as long as it corresponds to that of the top surface 1071 of the back surface center portion 107 of the lamp unit 1.

As shown in FIG. 3, the mounting unit 20 may further include a cylindrical insertion portion 207 that extends from the center of the base plate 201 in the extension direction of the side plate 203. When the mounting unit 20 is mounted on the lamp unit 1, the cylindrical insertion portion 207 may be inserted into the open pore 1077 in the center of the back surface center portion 107 of the lamp unit 1, so as to further fix the mounting unit 20 and the lamp unit 1.

Optionally, the center of the base plate 201, specifically, the cylinder wall of the cylindrical insertion portion 207, is provided with mounting holes 2071 for fixing the mounting unit 20 to a predetermined position, wherein the mounting holes 2071 may be a nail hole for mounting a traceless nail.

Three mounting holes 2071 are shown in FIG. 3, but the present disclosure is not limited thereto, and there may be more than three mounting holes 2071.

Figure 4:
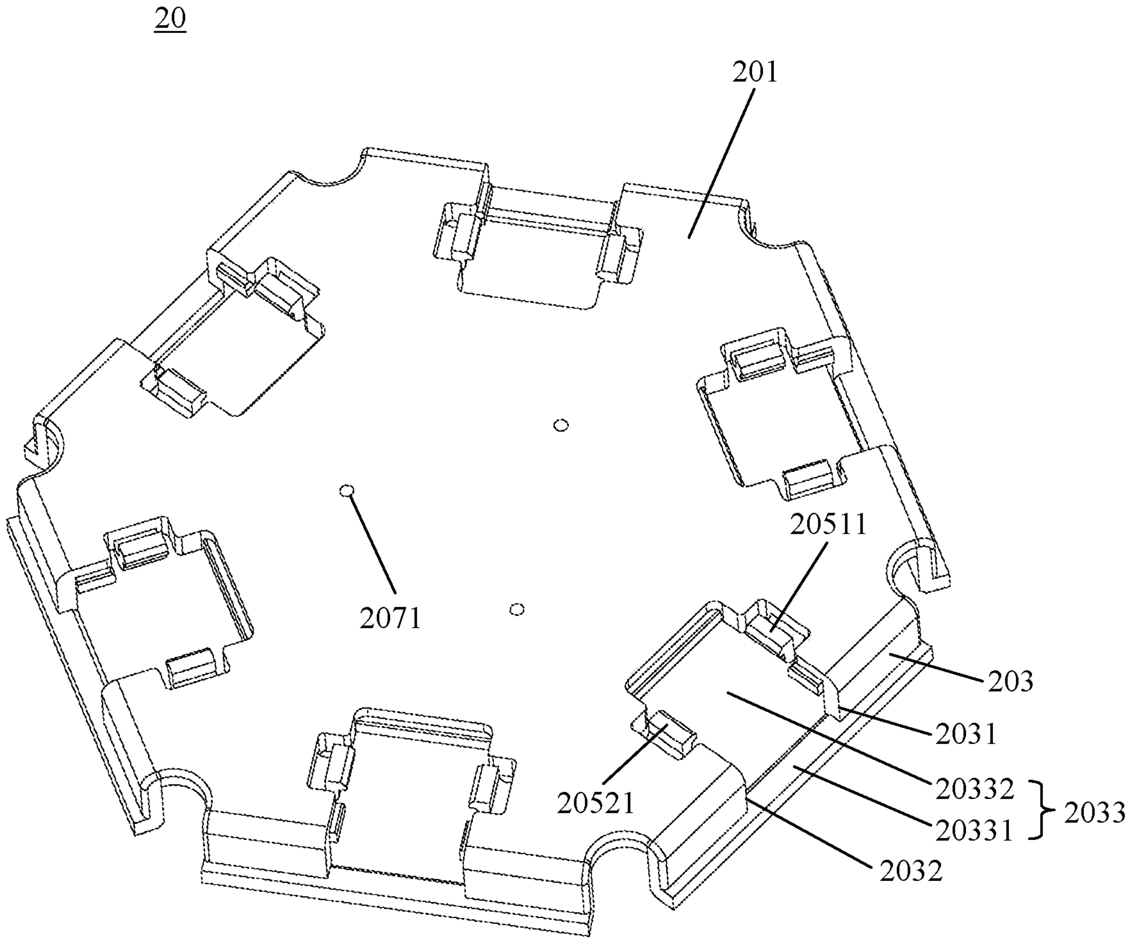
FIG. 4 shows another specific structural diagram of the mounting unit according to the embodiment of the present disclosure.

In the mounting unit according to the embodiment of the present disclosure shown in FIG. 3, the connection position is a plug-in stuck slot, the contactor may be inserted into the connection position, so as to be fixed by the contactor fixing member, and the connection position is only disposed in the side plate of the mounting unit, but the present disclosure is not limited thereto. The connection position may be a press-type stuck slot, and the contactor may be pressed to the connection position, so as to be fixed by the contactor fixing member. For example, the connection positions may be disposed in the side plate and the base plate of the mounting unit, which is especially suitable for the design in which the back surface center portion is flush with or lower than the back surface of the lamp panel. FIG. 4 shows another specific structural diagram of the mounting unit of the lamp unit according to the embodiment of the present disclosure. In FIG. 4, the connection positions are disposed in the side plate and the base plate of the mounting unit. For the sake of clarity, in FIG. 4, components similar to those in FIG. 3 are annotated by the same reference signs.

As shown in FIG. 4, the connection position 2033 includes a first portion 20331 and a second portion 20332, and the first portion 20331 extends from the edge of the base plate 201 in the side plate 203 along the peripheral direction of the base plate 201 and the extension direction of the side plate 203. The first portion 20331 of the connection position 2033 is provided, in the side plate, with a first wall portion 2031 and a second wall portion 2032, which are opposite to each other in the peripheral direction of the base plate 201. The second portion 20332 of the connection position 2033 extends from the first wall portion 2301 and the second wall portion 2032 perpendicular to the side plate 203 toward the center direction of the base plate 201, and the first portion 20331 and the second portion 20332 are penetrated through to form the connection position 2033.

The second portion 20332 includes a first side corresponding to the first wall portion 2031 and a second side corresponding to the second wall portion 2032, the contactor fixing member 205 includes a first protrusion 20511 protruding from the base plate 201 on the first side and a second protrusion 20521 protruding from the base plate 201 on the second side, and the first protrusion 20511 and the second protrusion 20521 protrude opposite to each other from the base plate 201 toward the space between the first side and the second side.

The configuration of other portions of the mounting unit in FIG. 4 is the same as that of the mounting unit in FIG. 3 except that the disposition of the connection position 2033, the first protrusion 20511 and the second protrusion 20521 is different from that of the mounting unit in FIG. 3. In order to avoid obscuring the present disclosure due to repeated descriptions, the other portions of the mounting unit in FIG. 4 will not be described in detail here.

In the lamp unit 1, the shape of the top surface 1071 of the back surface center portion 107 and the shape of the mounting unit 20 (that is, the shape of the base plate 201 of the mounting unit 20) correspond to that of the lamp panel 10, for example, they are all hexagons, therefore, the mounting unit can be mounted on the lamp panel more easily, the lamp units can be spliced and combined more easily, and the appearance of the lamp units is beautiful.

Figure 5:
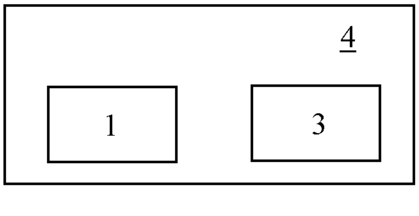
FIG. 5 shows a block diagram of a lamp system according to an embodiment of the present disclosure.
Figure 6A:
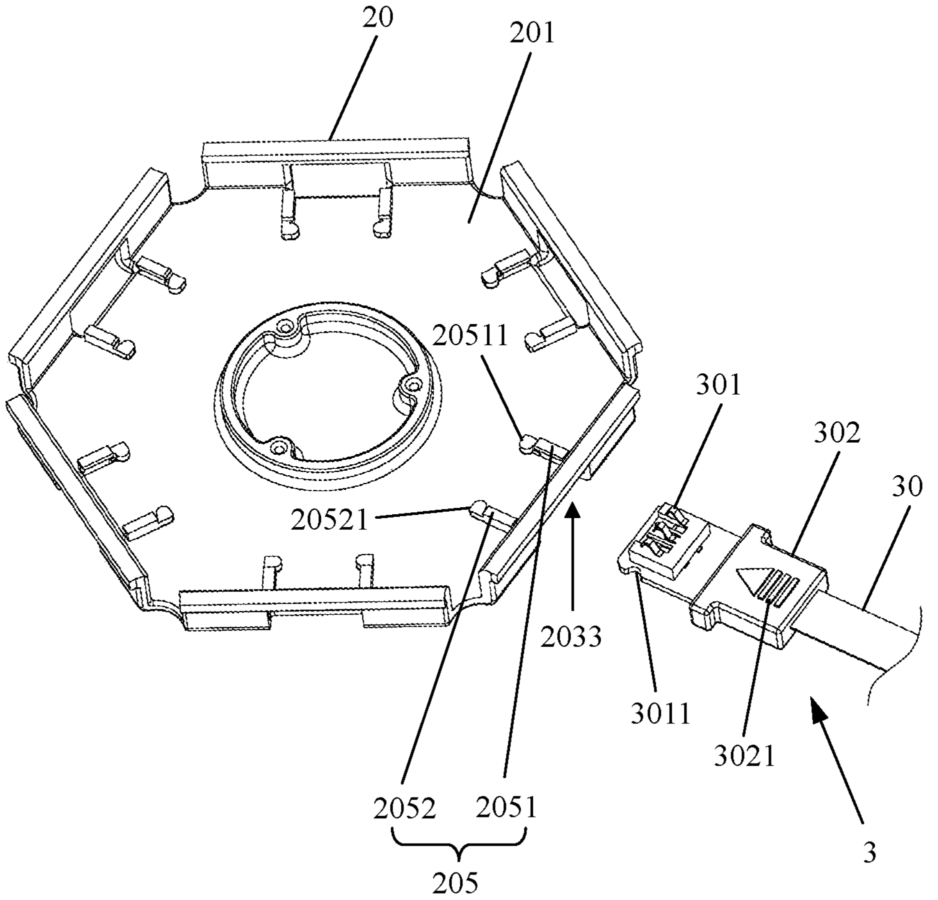
FIG. 6*a* and FIG. 6*b* show structural diagrams of a specific example of the lamp system according to the embodiment of the present disclosure.
Figure 6B:
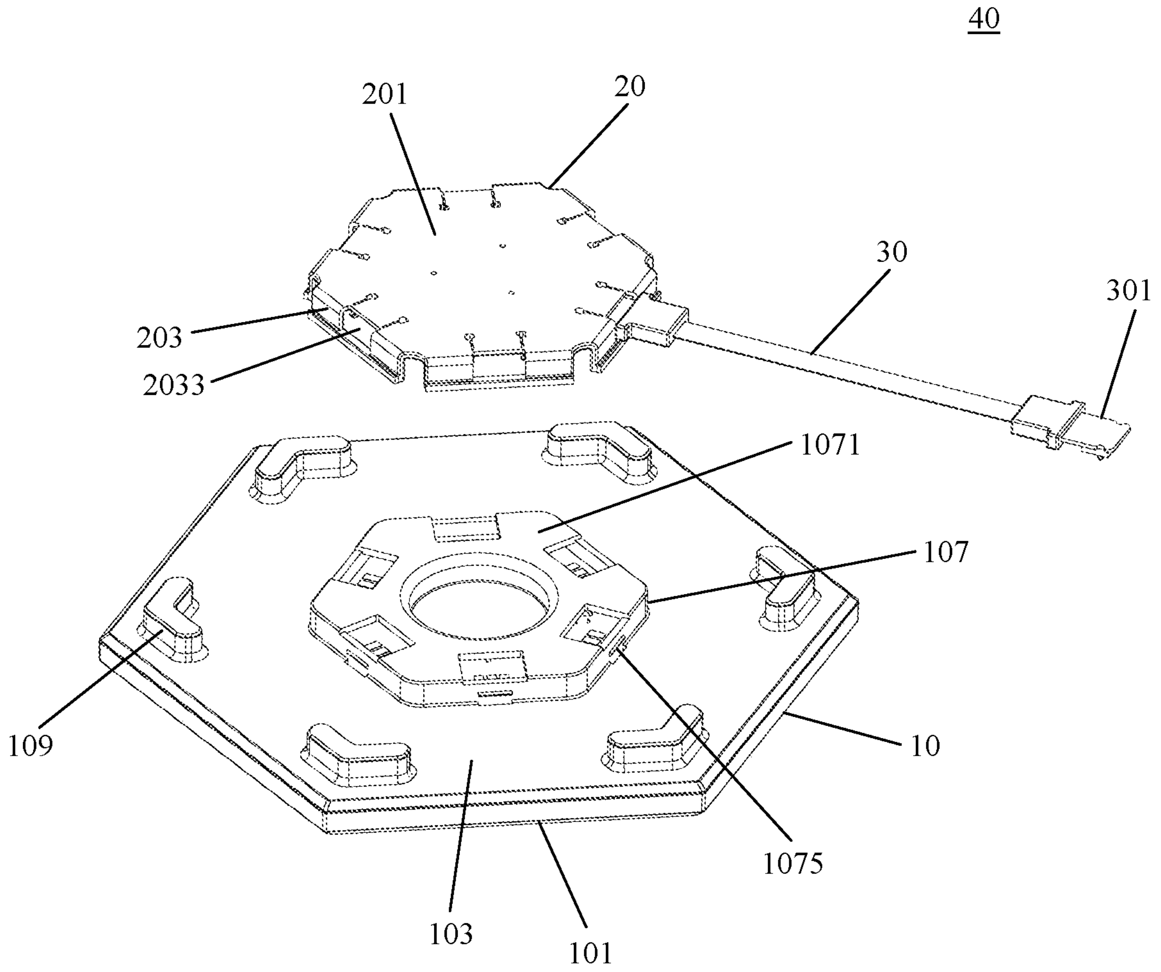
Figure 7A:
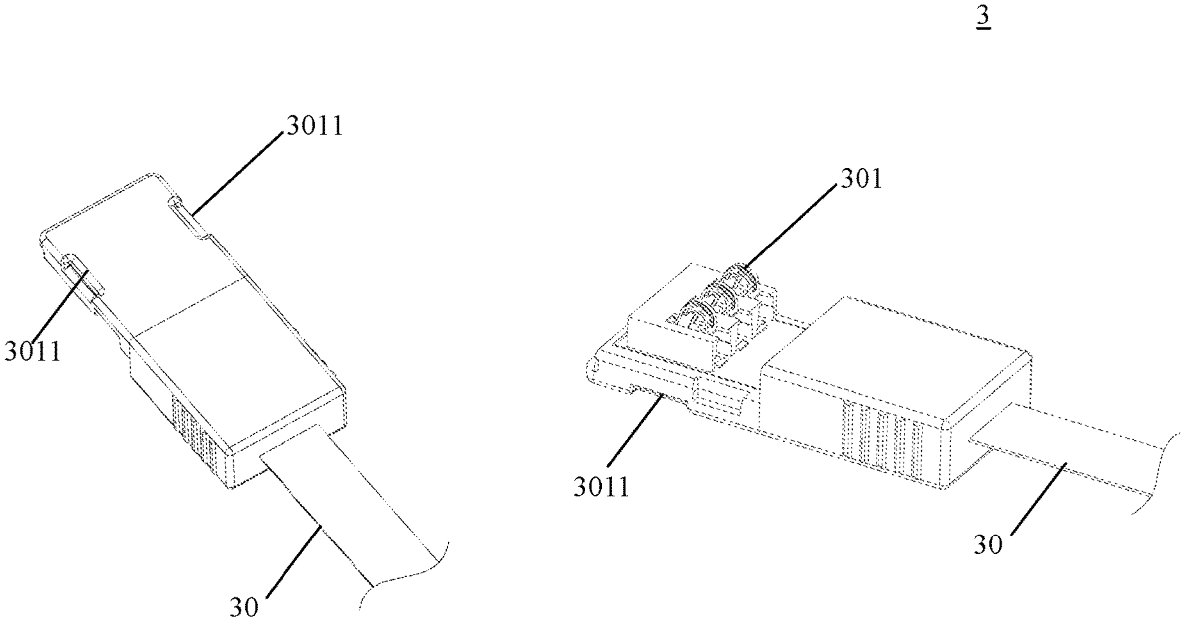
FIG. 7*a* and FIG. 7*b* show structural diagrams of another specific example of the lamp system according to the embodiment of the present disclosure.
Figure 7B:
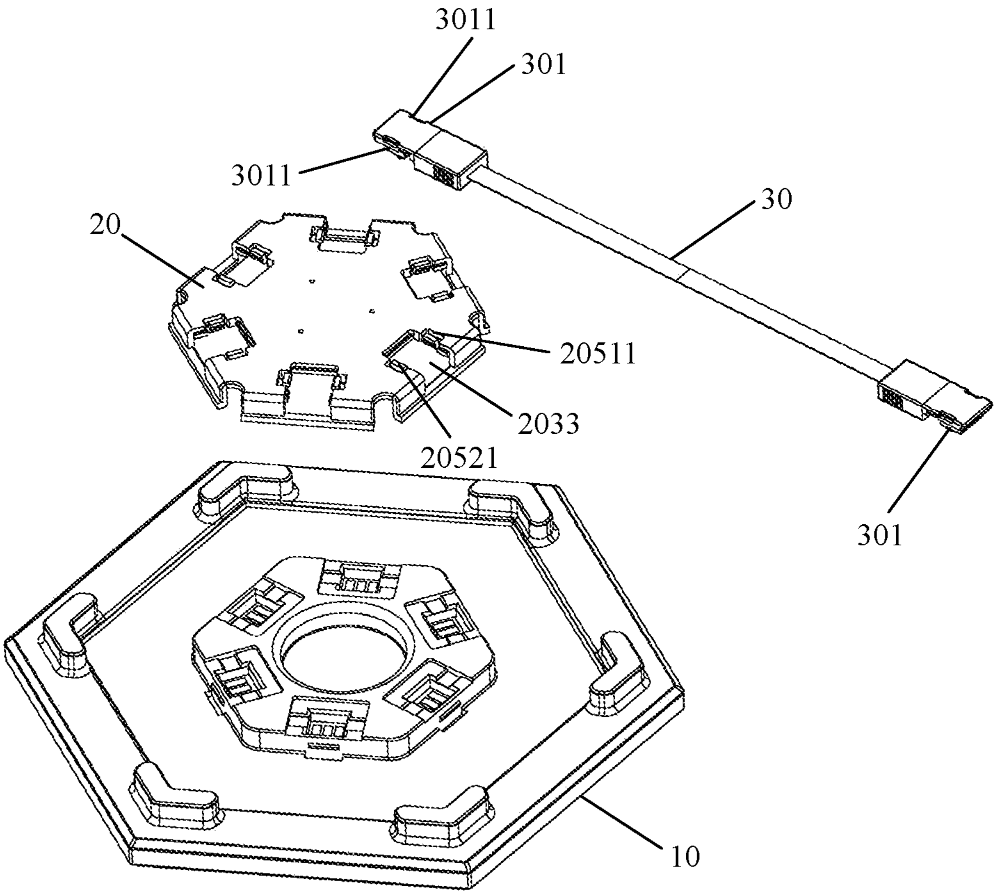

According to another embodiment of the present disclosure, a lamp system is provided. FIG. 5 shows a block diagram of the lamp system according to the embodiment of the present disclosure; FIG. 6*a* and FIG. 6*b* show structural diagrams of a specific example of the lamp system according to the embodiment of the present disclosure, wherein FIG. 6*a* shows a diagram in which the connector is about to be connected to the mounting unit, and FIG. 6*b* shows a diagram in which the mounting unit is about to be mounted on the lamp unit; and FIG. 7*a* and FIG. 7*b* show structural diagrams of another specific example of the lamp system according to the embodiment of the present disclosure, wherein FIG. 7*a* shows another disposition manner of the connector, and FIG. 7*b* shows a diagram in which the connector, the mounting unit and the lamp unit are about to be mounted together. The lamp system according to the embodiment of the present disclosure will be described below with reference to FIG. 5 to FIG. 7*b*. In FIG. 5 to FIG. 7*b*, the same components as those described above are annotated by the same reference signs.

As shown in FIG. 5, the lamp system 4 includes a plurality of lamp units 1 and at least one connector 3.

It should be noted that, the lamp unit 1 here is the lamp unit 1 according to the embodiment of the present disclosure described above in conjunction with FIG. 1 to FIG. 4. In order to avoid obscuring the present disclosure due to repeated descriptions, the specific structure of the lamp unit 1 will not be described in detail here, and specific components and details of the lamp unit 1 mentioned below may refer to the above descriptions.

In addition, in the following descriptions, for the convenience of description, the connection portion, which is disposed at the position corresponding to each electrical contact point on the side surface 1073 of the back surface center portion 107 of the lamp panel 10, is referred to as a first connection portion 1075, and the connection portion, which is disposed on the side of the side plate of the mounting unit 20 facing the center direction of the base plate, is referred to as a second connection portion. By means of the cooperation between the first connection portion and the second connection portion, the mounting unit 10 may be stably mounted on the lamp panel 10.

In the lamp system 4, each mounting unit 20 is disposed corresponding to each lamp panel 10, the shape of the base plate 201 of the mounting unit 20 corresponds to that of the top surface 1071 of the back surface center portion 107 of the lamp panel 10, and as shown in FIG. 6*a*, FIG. 6*b* and FIG. 7*b*, both may be hexagons. Preferably, the mounting unit 10 is detachably mounted on the back surface center portion 107 in a snapping manner.

The first connection portion 1075 on the side surface of the lamp panel 10 may cooperate with the second connection portion on the side plate of the mounting unit 20, so as to mount the mounting unit 20 on the back surface center portion 107 from the top surface 1071 of the back surface center portion 107 of the lamp panel 10. In the lamp system shown in FIG. 6*b* and FIG. 7*b*, the second connection portion, such as a protrusion or a recess, is not additionally disposed on the side plate 203 of the mounting unit 20, but the connection position 2033 on the side plate 203 of the mounting unit 20 is used as the second connection portion, the first connection portion 1075 is a protrusion that protrudes outward from the side surface 1073 of the lamp panel 10, and when the mounting unit 20 is mounted on the lamp panel 10, the protrusion on the side surface 1073 is clamped in the connection position of the mounting unit 20, so as to fix the mounting unit 20 on the back surface center portion 107 of the lamp panel 10. Regarding the disposition of the first connection portion and the second connection portion, the present disclosure is not limited thereto, the mounting of the mounting unit and the lamp unit may be realized by the cooperation between the protrusion and the recess, and on which connection portion the protrusion and the recess are provided and how many protrusions and recesses are provided may be designed as required.

Each connector 3 has a first end, a second end, and a portion 30 for connecting the first end with the second end, wherein the portion 30 may be a flexible conductor. Both the first end and the second end are provided with contactors 301 that may be electrically connected to the electrical contact points on the lamp unit 1.

FIG. 6*a* shows a case where the contactor 301 on one end of the connector 3 has not been accommodated in the mounting unit 20, and FIG. 6*b* shows a case where the contactor 301 on one end of the connector 3 has been accommodated in the mounting unit 20 and the mounting unit 20 is about to be mounted on the lamp panel 10. As shown in FIG. 6*a*, both sides of the contactor 301 are provided with two semicircular recesses 3011, which penetrate through a bottom plate in the thickness direction of the bottom plate for supporting the contactor 301. As shown in FIG. 6*a*, it may be understood that, when the contactor 301 is accommodated in the connection position 2033 in the mounting unit 20, the first protrusion 20511 and the second protrusion 20521 of the contactor fixing member 205 are respectively located in the recesses 3011, which are provided on the both sides of the contactor 301. In order to conveniently mount the connector 3 on the mounting unit 20, a grabbing portion 302 in the shape of a knife handle is mounted at a position of the connector 3 that is close to the contactor 301, and the surface of the grabbing portion 302 is provided with anti-skid patterns, for example, slightly convex anti-skid patterns 3021.

However, the disposition of the connector 3 is not limited to thereto, and other disposition manners are also possible. FIG. 7 a shows another disposition manner of the connector 3, wherein the figure on the left is a rear view of the connector 3, and the figure on the right is a front view of the connector 3. As shown in FIG. 7*a*, the both sides of the contractor 301 are also provided with two recesses 3011, but the two recesses 3011 are elongated, and the recesses 3011 do not penetrate through the bottom plate in the thickness of the bottom plate for supporting the contactor 301. As shown in FIG. 7*a*, the grabbing portion in the shape of the knife handle is not disposed at the position close to the contactor 301, but the anti-skid patterns are disposed on the both sides of the grabbing portion. FIG. 7*b* shows a case where various portions of the lamp system are not mounted together yet. As shown in FIG. 7*b*, it may be understood that, when the contactor 301 is accommodated in the connection position 2033 in the mounting unit 20, the first protrusion 20511 and the second protrusion 20521 of the contactor fixing member 205 are respectively located in the recesses 3011, which are provided on the both sides of the contactor 301.

In the lamp system 4, the mounting unit 20 is mounted on the lamp panel 10 by means of the cooperation between the second connection portion and the first connection portion of the lamp panel 10, the contactor 301 on the first end of the connector 3 is accommodated in one connection position 2033 of one mounting unit 20 that is mounted on one lamp panel 10, and is fixed by the contactor fixing member 205 at the one connection position 2033. The contactor 301 on the second end of the connector 3 is accommodated in another connection position 2033 of another other mounting unit 20 that is mounted on another lamp panel 10, and is fixed by the contactor fixing member 205 at the other connection position 2033. Each contactor 301 is electrically connected to the corresponding electrical contact points 105 by means of the opening in the lamp panel 10 for exposing the corresponding electrical contact point, respectively. It should be noted that, when the mounting unit 20 is mounted on the lamp panel 10, the connection positions on the mounting unit 20 are in one-to-one correspondence with the openings on the lamp panel 10 for exposing the corresponding electrical contact points.

Figure 8A:
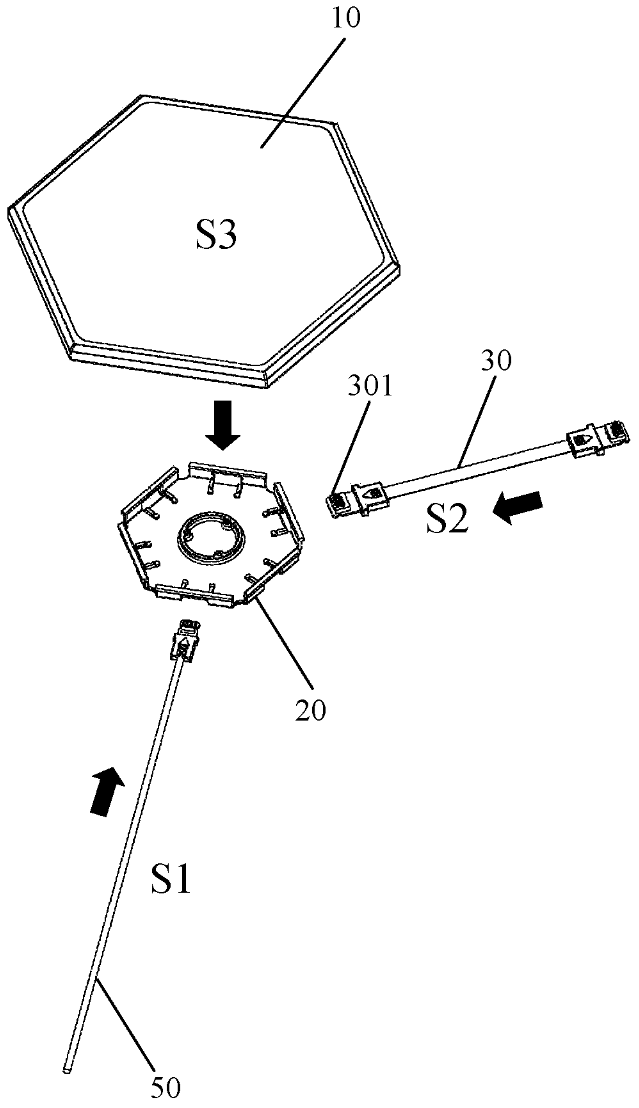
FIG. 8*a* and FIG. 8*b* show a mounting process of mounting the lamp system.
Figure 8B:
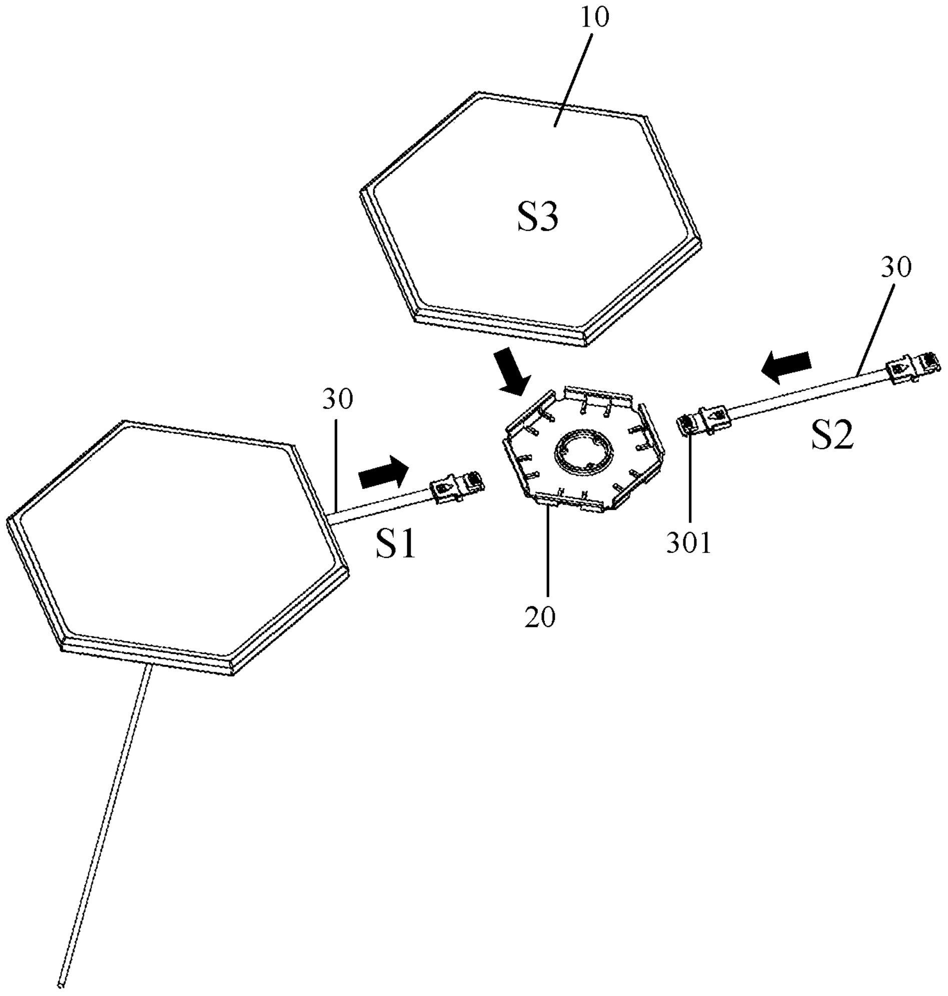
Figure 9A:
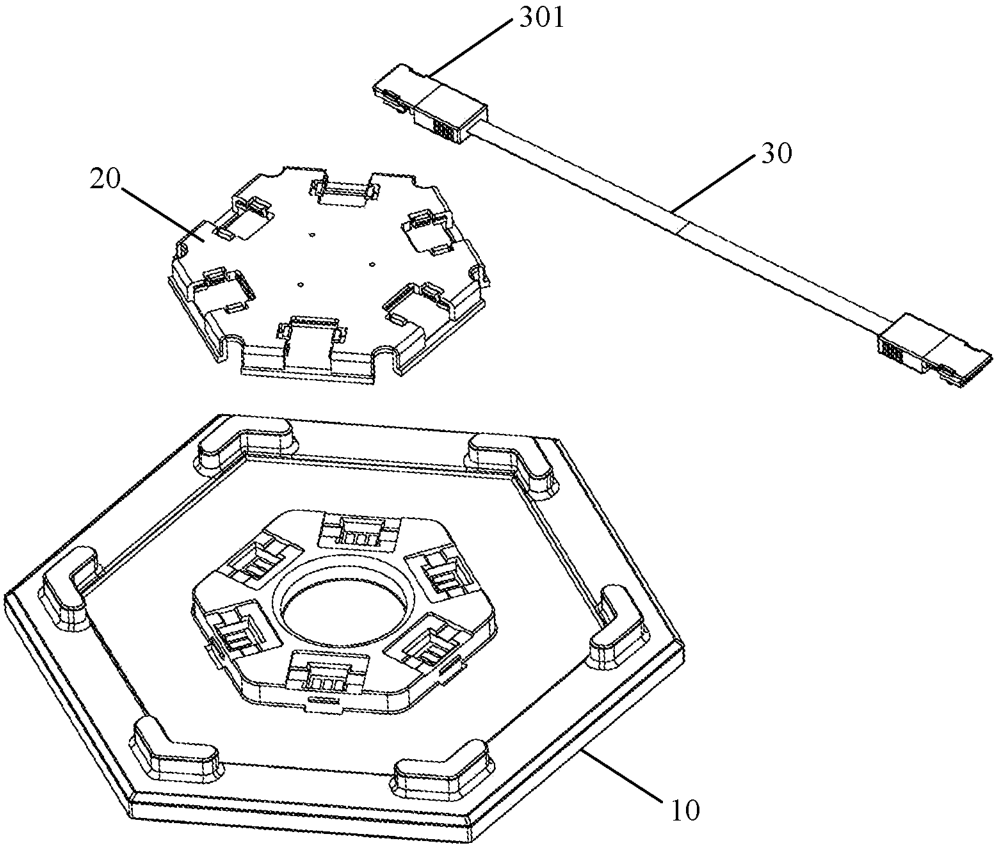
FIG. 9*a* to FIG. 9*c* show a mounting process of one lamp unit.
Figure 9B:
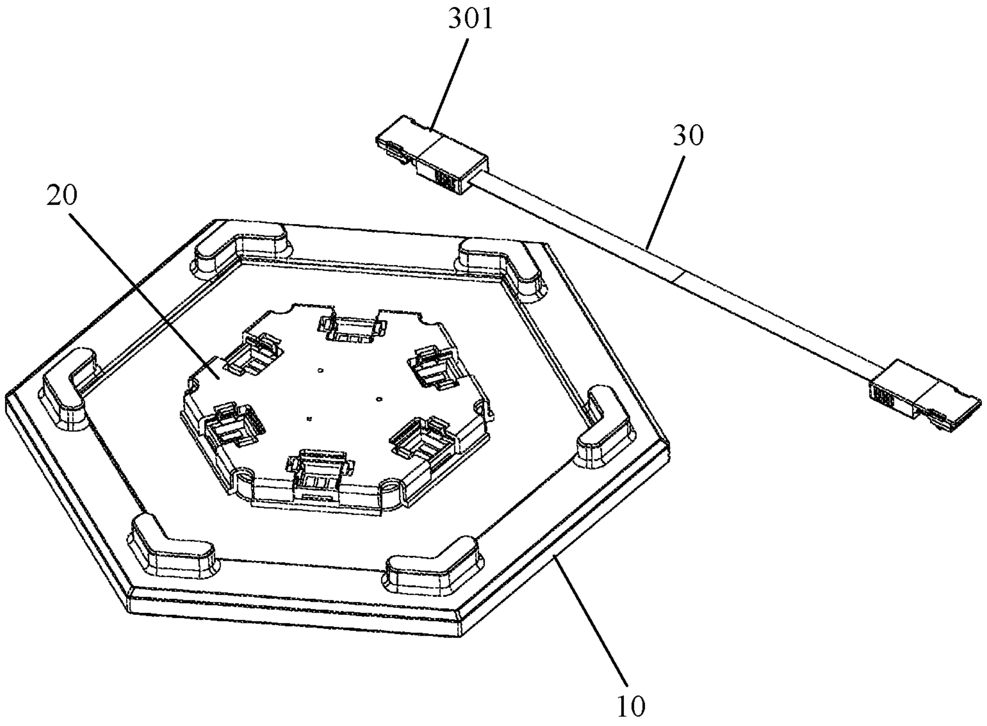
Figure 9C:
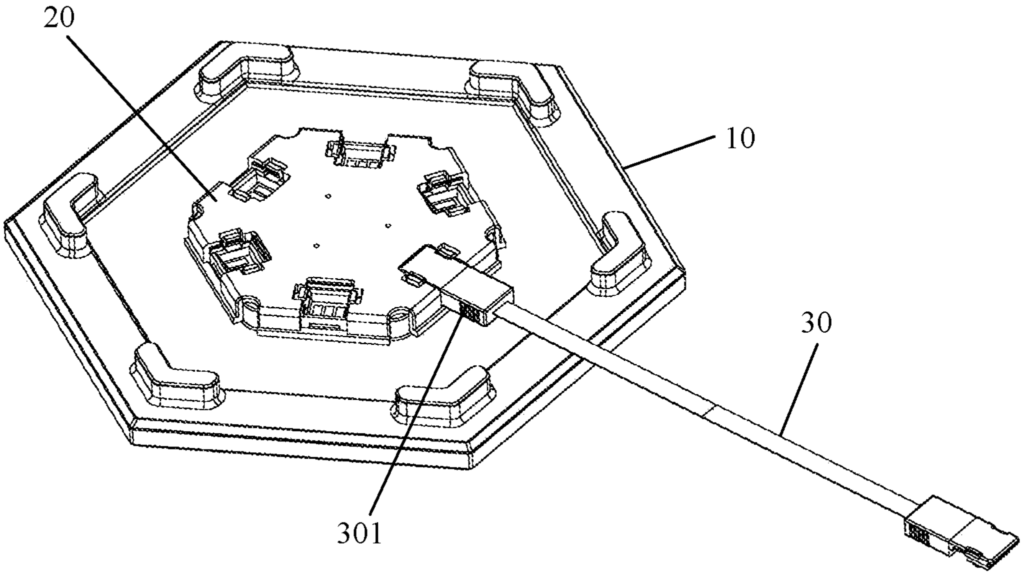

In the embodiment of the lamp system shown in FIG. 6*b*, the mounting unit corresponds to the mounting unit 20 described in combination with FIG. 3, and in the embodiment of the lamp system shown in FIG. 7*b*, the mounting unit corresponds to the mounting unit 20 described in combination with FIG. 4, the difference in the structures of the two mounting units makes the mounting steps of the lamp systems slightly different in the mounting process. To better understand the present disclosure, the specific mounting processes of the lamp systems with the two different mounting units described above will be described below in combination with FIG. 8*a* to FIG. 8*b* and FIG. 9*a* to FIG. 9*c*. FIG. 8*a* and FIG. 8*b* show a mounting process of mounting the lamp system, and FIG. 9*a* to FIG. 9*c* show a mounting process of one lamp unit. It should be noted that, the mounting unit in FIG. 8*a* and FIG. 8*b* corresponds to the mounting unit 20 described in combination with FIG. 3, and the mounting unit in FIG. 9*a* to FIG. 9*c* corresponds to the mounting unit 20 described in combination with FIG. 4.

A method for mounting the lamp system includes: inserting the contactor on one end of one connector into one connection position of a predetermined mounting unit; inserting the contactor on one end of another connector into another connection position of the predetermined mounting unit; mounting the predetermined mounting unit on a predetermined lamp unit, such that the contactor on one end of the one connector and the contactor on one end of the other connector are electrically connected to corresponding electrical contact points of the predetermined lamp unit, respectively; and mounting the predetermined lamp unit on a predetermined position by means of the predetermined mounting unit, wherein the contactor on the other end of the one connector is electrically connected to the corresponding electrical contact point of a previous lamp unit by means of the connection position of the mounting unit that is mounted on the previous lamp unit, and the contactor on the other end of the other connector is electrically connected to the corresponding electrical contact point of the next lamp unit by means of the connection position of the mounting unit that is mounted on the next lamp unit, the lamp system further includes a power line, the contactor on one end of the power line is inserted into one connection portion of the mounting unit that is mounted on the first lamp unit during the mounting process of the lamp system, so as to supply power to the lamp system by means of the corresponding electrical contact point, and the contactor, which is electrically connected to the corresponding electrical contact point, is inserted into only one connection portion of the mounting unit that is mounted on the last lamp unit during the mounting process of the lamp system, both the first lamp unit and the last lamp unit are mounted on corresponding positions by means of the corresponding mounting units, and the predetermined lamp unit does not include the first lamp unit or the last lamp unit.

Specifically, FIG. 8*a* shows the mounting process of the first lamp unit 1, and serial numbers S1, S2 and S3 in FIG. 8*a* indicate the mounting sequence of the first lamp unit 1. Specifically, firstly, as indicated by the serial number S1, the contactor on one end of the power line 50 is inserted into one connection position of one mounting unit 20. Here, the structure of the contactor on one end of the power line 50 is completely the same as that of the contactor on one end of the connector as described herein. Then, as indicated by the serial number S2, the contactor 301 on one end of one connector 3 is inserted into another connection position of one mounting unit 20. Then, as indicated by the serial number S3, the lamp panel 10 is mounted on the mounting unit 20 into which the power line 50 and the connector 3 are inserted, such that the contactor on one end of the power line 50 and the contactor on one end of the connector 3 are electrically connected to the corresponding electrical contact points, respectively. Finally, the first lamp unit 1 is mounted on a predetermined position via the mounting unit 20, for example, the first lamp unit 1 is fixed on the predetermined position, for example, on a wall or ceiling, by means of adhesive or traceless nails on the back surface of the base plate of the mounting unit 20.

Specifically, FIG. 8*b* shows the mounting process of the next lamp unit, and serial numbers S1, S2 and S3 in FIG. 8*b* indicate the mounting sequence of the next lamp unit 1. Specifically, firstly, as indicated by the serial number S1, the contactor 301 on the other end of the connector 3, which extends out from the previous lamp unit, is inserted into one connection position of the next mounting unit 20. Here, the contactor 301 on the other end of the connector 3, which extends out from the first lamp unit 1, is inserted into one connection position of the next mounting unit 20. Then, as indicated by the serial number S2, the contactor 301 on one end of another connector 3 is inserted into another connection position of the next mounting unit 20. Then, as indicated by the serial number S3, the lamp panel 10 is mounted on the mounting unit 20 into which two connectors 3 are inserted, such that the contactors of the two connectors are in contact with the corresponding electrical contact points, respectively. Finally, the next lamp unit 1 is mounted on a predetermined position via the next mounting unit 20, for example, the next lamp unit 1 is fixed on the predetermined position, for example, on the wall, by means of adhesive or traceless nails on the back surface of the base plate of the next mounting unit 20.

In a manner similar to FIG. 8*b*, the next lamp unit 1 is mounted with the next mounting unit 20, and the mounted lamp unit is fixed on a predetermined position, until the last lamp unit 1 is mounted on a predetermined position.

In the mounting unit that is mounted on the last lamp unit 1, only one connection position accommodates the contactor which is electrically connected to the corresponding electrical contact point.

In the lamp system shown in FIG. 6*b* and FIG. 8*a* to FIG. 8*b*, since the connection positions are disposed on the mounting unit rather than the back surface center portion of the lamp panel, the user can have a greater operating space to insert or press the contactors into the mounting unit, especially for those users with poor eyesight or inconvenient hands, the connection of the connector has a greater operating space, and thus the operation of mounting the connector on the lamp unit is easier. In addition, the higher-cost contactors, such as spring metals or other terminals, are disposed on the both ends of the connector instead of on the lamp panel, and the lamp units can be connected together by using the connector as needed, thereby avoiding the waste of the higher-cost terminals such as the spring metals, and reducing the manufacturing cost.

FIG. 9*a* to FIG. 9*c* show the mounting process of one lamp unit. As shown in FIG. 9*a*, the lamp panel 10, the mounting unit 20 and the connector 3 are in a separated state. In FIG. 9*b*, the mounting unit 20 is mounted on the lamp panel 10 to obtain an assembly of the mounting unit and lamp panel, and a plurality of assemblies of mounting units and lamp panels may be obtained in this way. As shown in FIG. 9*c*, in the assembly, the contactor 301 on one end of the connector 3 is pressed into one connection position of the mounting unit of the assembly.

Optionally, a method for mounting the lamp system includes: step 1, correspondingly mounting the mounting unit on the back surface center portion of the lamp panel, so as to obtain a predetermined assembly of the mounting unit and the lamp panel, such that the connection positions on the mounting unit are in one-to-one correspondence with the openings of the back surface center portion and the electrical contact points in the openings; step 2, connecting the contactor on one end of one connector to one connection position of the mounting unit in one predetermined assembly, such that the contactor on one end of the one connector is electrically connected to the electrical contact point in the opening of the back surface center portion, which corresponds to the one connection position; step 3, mounting the one predetermined assembly on a predetermined position by means of the mounting unit in the one predetermined assembly; step 4, pressing the contactor on the other end of the one connector into one connection position of the mounting unit in another predetermined assembly, such that the contactor on the other end of the one connector is electrically connected to the electrical contact point in the opening of the back surface center portion, which corresponds to the one connection position of the mounting unit in the other predetermined assembly, wherein the lamp system includes a power line, the contactor on one end of the power line is connected to one connection position of the mounting unit in the first predetermined assembly during the mounting process of the lamp system, so as to supply power to the lamp system.

Specifically, during the mounting process of the lamp system, specifically, as shown in FIG. 9*b*, a plurality of assemblies of mounting units and lamp panels are obtained at first. For the first assembly among the plurality of assemblies, the contactor on one end of the power line is pressed into one connection position of the mounting unit of the assembly, such that the contactor is in electrical contact with the corresponding electrical contact point. Here, the structure of the contactor on one end of the power line is exactly the same as that of the contactor on one end of the connector as described herein. Then, the contactor on one end of one connector is pressed into another connection position of the mounting unit of the first assembly, such that the contactor is in electrical contact with the corresponding electrical contact point. Finally, the first assembly is mounted on a predetermined position via the mounting unit in the first assembly, for example, the first assembly is fixed on the predetermined position by adhesive or traceless nails on the back surface of the base plate of the mounting unit. The above-mentioned mounting process is similar to that in FIG. 8*a*, and thus may be understood with reference to this figure.

For the next assembly among the plurality of assemblies, first, the contactor on the other end of the connector, which extends out from the previous assembly, is pressed into one connection position of the mounting unit of the next assembly, for example, the contactor on the other end of the connector, which extends out from the first assembly, is pressed into one connection position of the mounting unit in the next assembly. Then, the contactor of one end of another connector is pressed into another connection position of the mounting unit in the next assembly. Finally, the next assembly is mounted on a predetermined position via its mounting unit, for example, the next assembly is fixed on the predetermined position by adhesive or traceless nails on the back surface of the base plate of the mounting unit in the next assembly. The above-mentioned mounting process is similar to that in FIG. 8*b*, and thus may be understood with reference to this figure.

In a similar manner as described above, the next assembly may be mounted on a predetermined position, until the last assembly is mounted on a predetermined position.

It should be noted here that, in the mounting unit of the last assembly, only one connection position accommodates the contactor which is electrically connected to the corresponding electrical contact point.

By means of the above manner, the mounting unit can be mounted on the lamp panel when the lamp system leaves the factory, and the user can splice and combine the lamp units just by directly pressing the contactor of the connector into the stuck slot, such that the mounting of the lamp system is easier and more convenient.

The case where the mounting unit is mounted on the lamp panel at first, and then the connector is mounted is described above, but the present disclosure is not limited thereto, and the connector may also be mounted on the mounting unit at first, and then the mounting unit is mounted on the lamp panel.

In the lamp system shown in FIG. 7 and FIG. 9*a* to FIG. 9*c*, since the connection position is disposed on the base plate of the mounting unit, the connector may be fixed on the mounting device in a pressing manner before or after the mounting unit is mounted on the lamp panel, such that there is a greater operating space for connecting the connector, and the thus operation of mounting the connector on the lamp unit is easier.

In the above embodiments of the present disclosure, the description of each embodiment has its own emphasis. For portions that are not described in detail in a certain embodiment, reference may be made to related descriptions of other embodiments.

The above descriptions are only preferred embodiments of the present disclosure. It should be pointed out that, for those of ordinary skill in the art, several improvements and modifications may be made without departing from the principles of the present disclosure, and these improvements and modifications should be regarded as the protection scope of the present disclosure.

The invention claimed is:

1. A lamp unit, comprising:

a lamp panel having a light-emitting surface and a back surface opposite to the light-emitting surface, wherein a cavity formed by the light-emitting surface and the back surface is provided with light-emitting elements and a plurality of electrical contact points that are electrically connected to the light-emitting elements, and a plurality of openings are formed in the back surface at positions corresponding to each of the electrical contact points, so as to expose the electrical contact points; and a mounting unit configured to be detachably mounted on a back surface center portion of the back surface and used for mounting the lamp unit on a predetermined position, wherein the mounting unit is provided with a plurality of connection positions corresponding to the openings in the back surface center portion, and the connection positions are used for forming an electrical connection with another lamp unit.

2. The lamp unit according to claim 1, wherein the back surface center portion is disposed at the center of the back surface, and the plurality of openings for exposing the electrical contact points are formed in a top surface of the back surface center portion at positions corresponding to each of the electrical contact points.

3. The lamp unit according to claim 1, wherein, the mounting unit is detachably mounted on the back surface center portion in a snapping manner.

4. The lamp unit according to claim 1, wherein, the shape of the top surface of the back surface center portion corresponds to that of the mounting unit, and the plurality of openings for exposing the plurality of electrical contact points on the top surface are formed at uniform intervals along the edge of the top surface.

5. The lamp unit according to claim 1, wherein the shape of the top surface of the back surface center portion and the shape of the mounting unit correspond to that of the lamp panel.

6. The lamp unit according to claim 1, wherein, the back surface center portion protrudes from the center of the back surface in a direction opposite to the light-emitting surface.

7. The lamp unit according to claim 1, wherein the mounting unit comprises:

a base plate; and a side plate, wherein the side plate extends on the edge of the base plate in a direction perpendicular to the base plate, and a plurality of connection positions are disposed on the side plate.

8. The lamp unit according to claim 1, wherein each connection position is provided with a contactor fixing member.

9. The lamp unit according to claim 7, wherein, the center of the base plate is provided with a mounting hole for fixing the mounting unit to a predetermined position.

10. A lamp system, comprising:

a plurality of lamp units, and each lamp unit comprising:

a lamp panel having a light-emitting surface and a back surface opposite to the light-emitting surface, wherein a cavity formed by the light-emitting surface and the back surface is provided with light-emitting elements and a plurality of electrical contact points that are electrically connected to the light-emitting elements, a back surface center portion is disposed at the center of the back surface, and a plurality of openings for exposing the electrical contact points are formed in a top surface of the back surface center portion at positions corresponding to each of the electrical contact points; and a mounting unit configured to be detachably mounted on the back surface center portion and used for mounting each lamp unit on a predetermined position, wherein the mounting unit is provided with a plurality of connection positions corresponding to the openings in the back surface center portion, and the connection positions are used for forming an electrical connection with another lamp unit; and at least one connector having a first end and a second end, and both the first end and the second end are provided with contactors, wherein the contactor on the first end of each connector is accommodated in one connection position of one mounting unit, and is electrically connected to the electrical contact point in the opening which corresponds to the one connection position of the one mounting unit, and the contactor on the second end of each connector is accommodated in another connection position of another mounting unit, and is electrically connected to the electrical contact point in the opening which corresponds to the other connection position of the other mounting unit, so as to electrically connect the plurality of lamp units.

11. The lamp system according to claim 10, wherein, the shape of the top surface of the back surface center portion corresponds to that of the mounting unit, and the plurality of openings for exposing the plurality of electrical contact points on the top surface are formed at uniform intervals along the edge of the top surface.

12. The lamp system according to claim 10, wherein the mounting unit is provided with a base plate having a shape corresponding to that of the top surface, and a side plate extending on the edge of the base plate toward the top surface in a direction perpendicular to the base plate, wherein the mounting unit is provided, at least on the side plate, with a plurality of connection positions, which correspond to the plurality of electrical contact points of the connected lamp unit, respectively.

13. The lamp system according to claim 10, wherein the shape of the top surface of the back surface center portion and the shape of the mounting unit correspond to that of the lamp panel.

14. The lamp system according to claim 12, wherein, each connection position is provided with a contactor fixing member for fixing the contactor that is accommodated in the connection position, the contactor on the first end of the connector is fixed by the contactor fixing member at one connection position of the one mounting unit, and the contactor on the second end of the connector is fixed by the contactor fixing member at the other connection position.

15. The lamp system according to claim 14, wherein, the back surface center portion protrudes from the center of the back surface in a direction opposite to the light-emitting surface, and the connection position is a plug-in stuck slot, wherein the contactor may be inserted into the connection position to be fixed by the contactor fixing member.

16. The lamp system according to claim 15, wherein, the connection position extends from the edge of the base plate in the side plate along a peripheral direction of the base plate and an extension direction of the side plate, and the portion of the connection position on the side plate is provided with a first wall portion and a second wall portion, which are opposite to each other in the peripheral direction of the base plate, the contactor fixing member comprises a first fixing member and a second fixing member, the first fixing member extends from the first wall portion perpendicular to the side plate toward the center direction of the base plate, the second fixing member extends from the second wall portion perpendicular to the side plate toward the center direction of the base plate, the first fixing member is provided with a first protrusion on the end portion away from the first wall portion, the second fixing member is provided with a second protrusion on the end portion away from the second wall portion, the first protrusion and the second protrusion protrude opposite to each other toward the space between the first fixing member and the second fixing member, the both sides of the contactor are provided with recesses, and when the contactor is accommodated in the connection position, the first protrusion and the second protrusion are respectively located in the recesses that are provided on the both sides of the contactor.

17. The lamp system according to claim 14, wherein, the connection position is a press-type stuck slot, wherein the contactor may be pressed to the connection position, so as to be fixed by the contactor fixing member.

18. The lamp system according to claim 17, wherein, the connection position comprises a first portion and a second portion, the first portion extends from the edge of the base plate in the side plate along the peripheral direction of the base plate and the extension direction of the side plate, the portion of the first portion on the side plate is provided with a first wall portion and a second wall portion, which are opposite to each other in the peripheral direction of the base plate, the second portion extends from the first wall portion and the second wall portion perpendicular to the side plate toward the center direction of the base plate, the first portion and the second portion are penetrated through to form the connection position, the second portion comprises a first side corresponding to the first wall portion and a second side corresponding to the second wall portion, the contactor fixing member comprises a first protrusion protruding from the base plate on the first side and a second protrusion protruding from the base plate on the second side, the first protrusion and the second protrusion protrude opposite to each other from the base plate toward the space between the first side and the second side, the both sides of the contactor are provided with recesses, and when the contactor is accommodated in the connection position, the first protrusion and the second protrusion are respectively located in the recesses that are provided on the both sides of the contactor.

19. The lamp system according to claim 10, wherein, the contactor is provided with a spring metal, and when the mounting unit is mounted on the back surface center portion, the spring metal forms, by means of the opening, an electrical connection with the electrical contact point in the opening.

20. The lamp system according to claim 10, wherein the contactors on the first end and the second end of the connector are connected by a flexible conductor.

21. The lamp system according to claim 10, wherein the first end and the second end of the connector are respectively provided with grabbing portions, and the surfaces of the grabbing portions are provided with anti-skid patterns.

22. A method for mounting the lamp system, comprising:

step 1, correspondingly mounting the mounting unit on the back surface center portion of the lamp panel, so as to obtain a predetermined assembly of the mounting unit and the lamp panel, such that the connection positions on the mounting unit are in one-to-one correspondence with the openings of the back surface center portion and the electrical contact points in the openings;

step 2, connecting the contactor on one end of one connector to one connection position of the mounting unit in one predetermined assembly, such that the contactor on one end of the one connector is electrically connected to the electrical contact point in the opening of the back surface center portion, which corresponds to the one connection position;

step 3, mounting the one predetermined assembly on a predetermined position by means of the mounting unit in the one predetermined assembly; and step 4, connecting the contactor on the other end of the one connector to one connection position of the mounting unit in another predetermined assembly, such that the contactor on the other end of the one connector is electrically connected to the electrical contact point in the opening of the back surface center portion, which corresponds to the one connection position of the mounting unit in the other predetermined assembly, wherein the lamp system comprises a power line, the contactor on one end of the power line is connected to one connection position of the mounting unit in the first predetermined assembly during the mounting process of the lamp system, so as to supply power to the lamp system.

* * * * *